United States Patent
Park et al.

(10) Patent No.: US 10,116,146 B2
(45) Date of Patent: Oct. 30, 2018

(54) NON-CONTACT POWER TRANSMISSION DEVICE AND LOCATION-BASED SERVICE SYSTEM USING THE SAME

(71) Applicant: Samsung Electro-Mechanics Co., Ltd., Suwon-si (KR)

(72) Inventors: Sung Heum Park, Suwon-Si (KR); Hyung Wook Cho, Suwon-Si (KR); Sang Ho Cho, Suwon-Si (KR); Sang Beom Lee, Suwon-Si (KR); Ki Won Chang, Suwon-Si (KR); Chul Gyun Park, Suwon-Si (KR); Jae Suk Sung, Suwon-Si (KR); Chang Soo Kang, Suwon-Si (KR); Hee Sun Han, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 301 days.

(21) Appl. No.: 14/885,689

(22) Filed: Oct. 16, 2015

(65) Prior Publication Data

US 2016/0126748 A1     May 5, 2016

(30) Foreign Application Priority Data

Nov. 3, 2014 (KR) .................. 10-2014-0151165

(51) Int. Cl.
*H02J 5/00* (2016.01)
*H04W 12/06* (2009.01)
(Continued)

(52) U.S. Cl.
CPC .............. *H02J 5/005* (2013.01); *H02J 50/10* (2016.02); *H02J 50/80* (2016.02); *H02J 50/90* (2016.02);
(Continued)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS 9,332,134 B2 * 5/2016 Wanstedt ............. H04M 15/61
9,755,437 B2 * 9/2017 Kuusilinna ........... H02J 7/0004
(Continued)

FOREIGN PATENT DOCUMENTS

CN    102142697 A    8/2011
CN    102576243 A    7/2012
(Continued)

OTHER PUBLICATIONS

Chinese Office Action dated Jul. 27, 2017 in corresponding Chinese Patent Application No. 201510661705.2 (35 page with English translation).
(Continued)

*Primary Examiner* — Levi Gannon
(74) *Attorney, Agent, or Firm* — NSIP Law

(57) ABSTRACT

A non-contact power transmission device includes a power transmission unit configured to contactlessly provide electric power; a controller configured to provide location information of the non-contact power transmission device; and a communications unit configured to transmit the location information and product information received from a non-contact power reception device to a server, and receive an approval to transmit electric power to the non-contact power reception device from the server.

18 Claims, 10 Drawing Sheets

(51) Int. Cl.
*H04W 4/02* (2018.01)
*H02J 50/80* (2016.01)
*H02J 50/90* (2016.01)
*H04L 29/06* (2006.01)
*H02J 50/10* (2016.01)
*H04W 12/08* (2009.01)
*H02J 7/00* (2006.01)

(52) U.S. Cl.
CPC .............. *H04L 63/107* (2013.01); *H04W 4/02* (2013.01); *H04W 12/06* (2013.01); *H04W 12/08* (2013.01); *H02J 2007/0001* (2013.01); *Y04S 40/24* (2013.01)

(58) Field of Classification Search
CPC .... H02J 50/80; H02J 50/90; H02J 2007/0001; H04L 63/107
USPC .......................................................... 307/104
See application file for complete search history.

(56) References Cited

U.S. PATENT DOCUMENTS

| | | | | |
|---|---|---|---|---|
| 2010/0083012 A1* | 4/2010 | Corbridge | ............. | G06F 1/1632 713/300 |
| 2010/0248622 A1* | 9/2010 | Lyell Kirby | ............ | H02J 7/025 455/41.1 |
| 2011/0184888 A1 | 7/2011 | Lee et al. | | |
| 2011/0195722 A1 | 8/2011 | Walter et al. | | |
| 2012/0235499 A1* | 9/2012 | Liu | ........................ | H02J 17/00 307/104 |
| 2012/0268238 A1* | 10/2012 | Park | ..................... | G07F 15/006 340/5.8 |
| 2013/0304583 A1* | 11/2013 | Han | .................. | G06Q 30/0267 705/14.64 |
| 2014/0002015 A1* | 1/2014 | Tripathi | ................ | B60L 11/182 320/108 |
| 2014/0125145 A1 | 5/2014 | Bae | | |
| 2014/0206384 A1 | 7/2014 | Kim et al. | | |
| 2015/0006395 A1* | 1/2015 | Chu | ........................ | G06Q 20/40 705/44 |
| 2015/0288423 A1* | 10/2015 | Chu | ........................ | H02J 7/025 307/104 |
| 2016/0056635 A1* | 2/2016 | Bell | ......................... | G06F 1/26 713/300 |

FOREIGN PATENT DOCUMENTS

| | | |
|---|---|---|
| CN | 102668309 A | 9/2012 |
| CN | 102792552 A | 11/2012 |
| EP | 2 355 304 A2 | 8/2011 |
| EP | 2 605 564 A1 | 6/2013 |
| JP | 2006-262255 A | 9/2006 |
| JP | 2010-33479 A | 2/2010 |
| KR | 10-2013-0032472 A | 4/2013 |
| KR | 10-1262641 B1 | 5/2013 |
| KR | 10-2013-0082952 A | 7/2013 |
| WO | WO 2011/025692 A1 | 3/2011 |
| WO | WO 2011/063054 A1 | 5/2011 |
| WO | WO 2011/112060 A2 | 9/2011 |

OTHER PUBLICATIONS

Extended European Search Report dated Mar. 17, 2016 in counterpart European Application No. 15187241,3 (6 pages in English).
Chinese Office Action dated Jan. 29, 2018 in counterpart Chinese Patent Application No. 201510661705.2 (21 pages, with English translation).

* cited by examiner

NON-CONTACT POWER TRANSMISSION DEVICE AND LOCATION-BASED SERVICE SYSTEM USING THE SAME

CROSS-REFERENCE TO RELATED APPLICATION(S)

This application claims the benefit under 35 USC 119(a) of Korean Patent Application No. 10-2014-0151165 filed on Nov. 3, 2014, in the Korean Intellectual Property Office, the entire disclosure of which is incorporated herein by reference for all purposes.

BACKGROUND

1. Field

This application relates to a non-contact power transmission device transmitting power contactlessly, a mobile terminal that is charged by the contactlessly transmitted power, a server, and a location-based service system using the same.

2. Description of Related Art

In accordance with advancements in wireless technology, various wireless services from data transmission to power transmission have been provided. Recently, wireless power transmission technology able to charge electronic devices without contact has been in the limelight.

The wireless power transmission technology provides a service enabling a mobile terminal to be charged without a physical connection with a charging device. Since this charging method is convenient and offers a high degree of freedom, the wireless power transmission technology has been applied in various ways.

However, a wireless charging technology has a limitation in that only a charging service is provided between a non-contact power transmission device and a non-contact power reception device, and thus the wireless charging technology is not able to provide a separate user-customized service or other service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a non-contact power transmission device includes a power transmission unit configured to contactlessly provide electric power; a controller configured to provide location information of the non-contact power transmission device; and a communications unit configured to transmit the location information and product information received from a non-contact power reception device to a server, and receive an approval to transmit electric power to the non-contact power reception device from the server.

The controller may include an information manager configured to provide the location information.

The controller may further include a charging controller configured to determine an authority for charging based on the approval to transmit electric power received from the server.

The information manager may be further configured to control the communications unit to transmit the location information to the server in response to the authority for charging being determined by the charging controller.

The communications unit may be further configured to receive location-based service data associated with the location information from the server; and the controller may further include a service data manager configured to receive the location-based service data associated with the location information from communications unit.

In another general aspect, a location-based service system includes a non-contact power transmission device configured to contactlessly provide electric power, receive product information of a non-contact power reception device, and transmit the product information and location information of the non-contact power transmission device; a non-contact power reception device configured to receive the electric power from the non-contact power transmission device and transmit the product information; a mobile terminal configured to be charged by electric power by the non-contact power reception device, receive the product information, and transmit the product information and user information of the mobile terminal; and a server configured to receive the location information, the product information from the non-contact power transmission device and the mobile terminal, and the user information, approve the non-contact power transmission device to transmit electric power in response to the product information received from the non-contact power transmission device matching the product information received from the mobile terminal, and transmit location-based service data based on the location information of the non-contact power transmission device.

The server may be further configured to transmit the location-based service data to either one or both of the non-contact power transmission device and the mobile terminal.

The he mobile terminal may include a charging unit configured to be charged by electric power contactlessly received from the non-contact power reception device according to an approval for the non-contact power transmission device to transmit electric power provided by the server; and a controller configured to transmit the user information and the product information to the server.

The controller of the mobile terminal may be further configured to receive the location-based service data.

The server may include a storing unit configured to store location information assigned to the non-contact power transmission device and location data associated with the location information, receive the location information from the non-contact power transmission device, and output the location data; and a location-based service provider configured to receive the location data, the product information from the non-contact power transmission device and the mobile terminal, and the user information, determine a location of the mobile terminal using the location data, approve the non-contact power transmission device to transmit electric power in response to the product information received from the non-contact power transmission device matching the product information received from the mobile terminal, and transmit the location-based service data based on the determined location of the mobile terminal.

The location-based service provider of the server may be further configured to determine the location of the non-contact power transmission device as the location of the mobile terminal based on the location data and the user information.

The server may be further configured to transmit the location-based service data based on the location information of the non-contact power transmission device and the user information of the mobile terminal.

In another general aspect, a wireless power transmission device includes a power transmission unit configured to wirelessly transmit power to a wireless power reception device; and a controller configured to provide location information enabling a server to identify a location of the wireless power transmission device; and control the power transmission unit to wirelessly transmit power to the wireless power reception device in response to an approval by the server of wireless transmission of power to the wireless power reception device.

The wireless power transmission device may further include a communications unit configured to transmit the location information to the server, and receive approval information indicating the approval from the server; and the controller may be further configured to control the power transmission unit to wirelessly transmit power to the wireless power reception device based on the approval information.

The communications unit may be further configured to receive from the wireless power reception device product information enabling the server to approve the wireless transmission of power to the wireless power reception device, and transmit the product information to the server.

The controller may be further configured to receive location-based service data selected by the server based on the location information.

The wireless power transmission device may further include a communications unit configured to transmit the location information to the server, receive approval information indicating the approval from the server, and receive the location-based service data from the server; and the controller may be further configured to control the power transmission unit to wirelessly transmit power to the wireless power reception device based on the approval information.

The communications unit may be further configured to transmit the location-based service data to a mobile terminal configured to be charged by power wirelessly received by the wireless power reception device from the power transmission unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
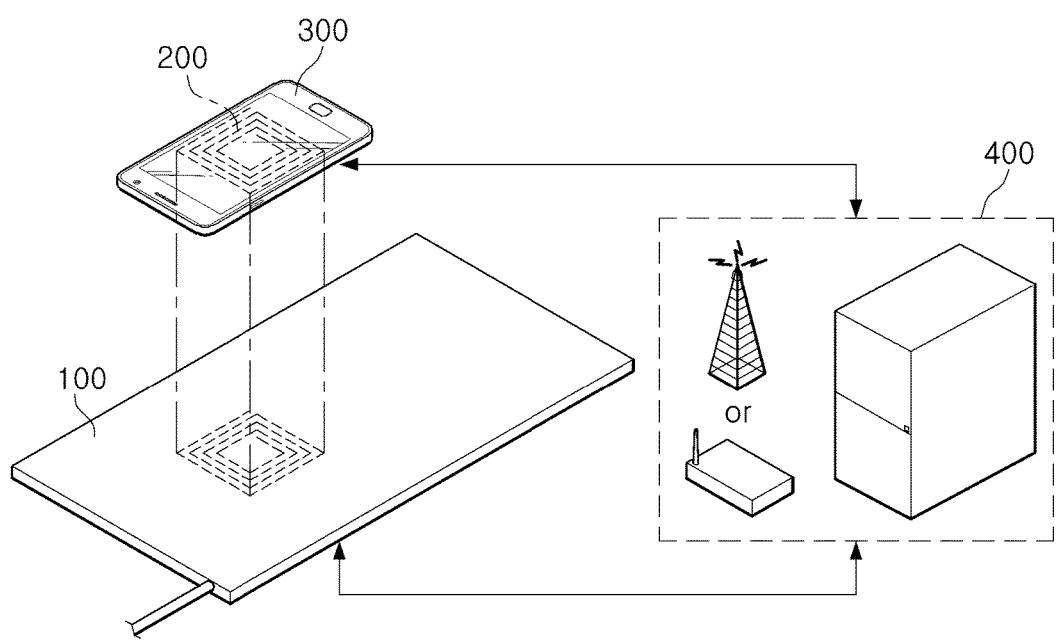
FIG. 1 is a configuration diagram illustrating an example of a location-based service system.

FIG. 1 is a configuration diagram illustrating an example of a location-based service system.

As shown in FIG. 1, a location-based service system includes a non-contact power transmission device 100, a non-contact power reception device 200, a mobile terminal 300, and a server 400.

The non-contact power transmission device 100 transmits power contactlessly to the non-contact power reception device 200.

A non-contact method of power transmission is a method in which power is transmitted from a conductor of a power transmission side to a conductor of a power reception side without a direct connection between the two conductors. The non-contact method may be also referred to as a contactless method or a wireless transmission method.

The non-contact power transmission device 100 receives an approval from the server 400 to transmit power to the non-contact power reception device 200. In addition, the non-contact power transmission device 100 receives location-based service data from the server 400.

A specific location of the non-contact power transmission device 100 is known. Since the non-contact power reception device 200 and the mobile terminal 300 are movable, specific locations thereof are not known, but a specific location of the non-contact power transmission device 100 is known.

Information on the specific location of the non-contact power transmission device 100 is managed by the server 400 or the mobile terminal 300. Hereinafter, although a description will be provided based on an example in which the server 400 manages the information on the location of the non-contact power transmission device 100, various other implementations are also possible.

The non-contact power reception device 200 charges the mobile terminal 300 using power transmitted from the non-contact power transmission device 100.

The non-contact power transmission device 100 and the non-contact power reception device 200 are not limited to a specific standard. For example, the non-contact power transmission device 100 and the non-contact power reception device 200 may be operated according to a standard in which a communication method has been preset (e.g., as set by the Alliance for Wireless Power (A4WP)) when wireless charging is performed. As another example, the non-contact power transmission device 100 and the non-contact power reception device 200 may be operated according to a standard in which a communication method has not been preset (e.g., as set by the Wireless Power Consortium or the Power Matters Alliance) when wireless charging is performed.

The mobile terminal 300 receives power from the non-contact power reception device 200. In addition, the mobile terminal 300 receives the location-based service data from the server 400.

The server 400 determines the location of the mobile terminal 300 by identifying the non-contact power transmission device 100. Since the location of the non-contact power transmission device 100 is known, the server 400 identifies the non-contact power transmission device 100 that the mobile terminal 300 is attempting to access and determines the specific location of the non-contact power transmission device 100 to be the location of the mobile terminal 300.

The server 400 provides location-based service data associated with the determined location of the mobile terminal 300 to either one or both of the mobile terminal 300 and the non-contact power transmission device 100.

Hereinafter, various examples of a location-based service system will be described with reference to the drawings. Contents overlapping with each other or corresponding to each other will not be repeated in the examples to be described below.

Figure 2A:
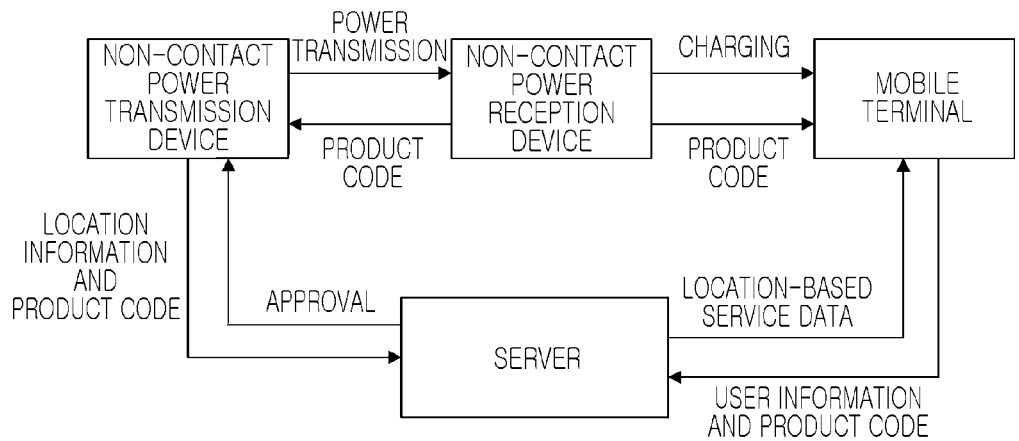
FIGS. 2A and 2B are block diagrams illustrating examples of a location-based service system.
Figure 2B:
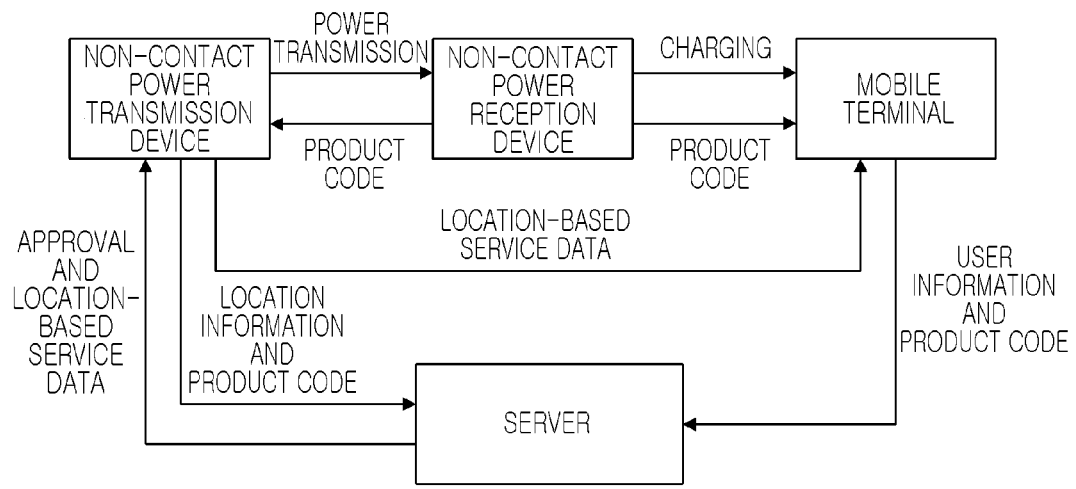

FIGS. 2A and 2B are block diagrams illustrating examples of a location-based service system.

Referring to FIG. 2A, the non-contact power reception device 200 transmits product information assigned to itself to the non-contact power transmission device 100 and the mobile terminal 300. The product information may be a unique product code.

The non-contact power transmission device 100 transmits location information assigned to itself and the product information received from the non-contact power reception device 200 to the server 400.

The mobile terminal 300 transmits user information assigned to itself and the product information received from the non-contact power reception device 200 to the server 400.

The server 400 compares the product information of the non-contact power reception device 200 received from the non-contact power transmission device 100 and the product information of the non-contact power reception device 200 received from the mobile terminal 300 with each other to determine whether or not the product information matches, and approves the non-contact power transmission device 100 to transmit power if the product information matches.

The non-contact power transmission device 100 provides power to the non-contact power reception device 200 according to the approval from the server 400.

The non-contact power reception device 200 receives the power provided by the non-contact power transmission device 100 and charges the mobile terminal 300 using the power. For example, the non-contact power reception device 200 may be provided as a component of the mobile terminal 300, or a separate device that may be connected to the mobile terminal 300.

The server 400 identifies the location of the mobile terminal 300 using the received location information and user information, and provides the location-based service data to the mobile terminal 300 using the identified location.

The location-based service data provided by the server 400 is not specifically limited to any particular kind of information. For example, the server 400 may provide an advertisement, a coupon, and or any other information associated with the location of the mobile terminal 300 as the location-based service data. As another example, the server 400 may also provide use of the non-contact power transmission device 100 associated with the corresponding location at a discount or at no cost as the location-based service data. In addition, for example, the server 400 may provide downloadable content such as a coupon, free-of-charge authentication information, an advertisement, and any other information associated with the identified location to the mobile terminal 300.

In another example, referring to FIG. 2B, the server 400 transmits the location-based service data to the non-contact power transmission device 100, and the non-contact power transmission device 100 transmits the transmitted location-based service data to the mobile terminal 300.

Figure 3:
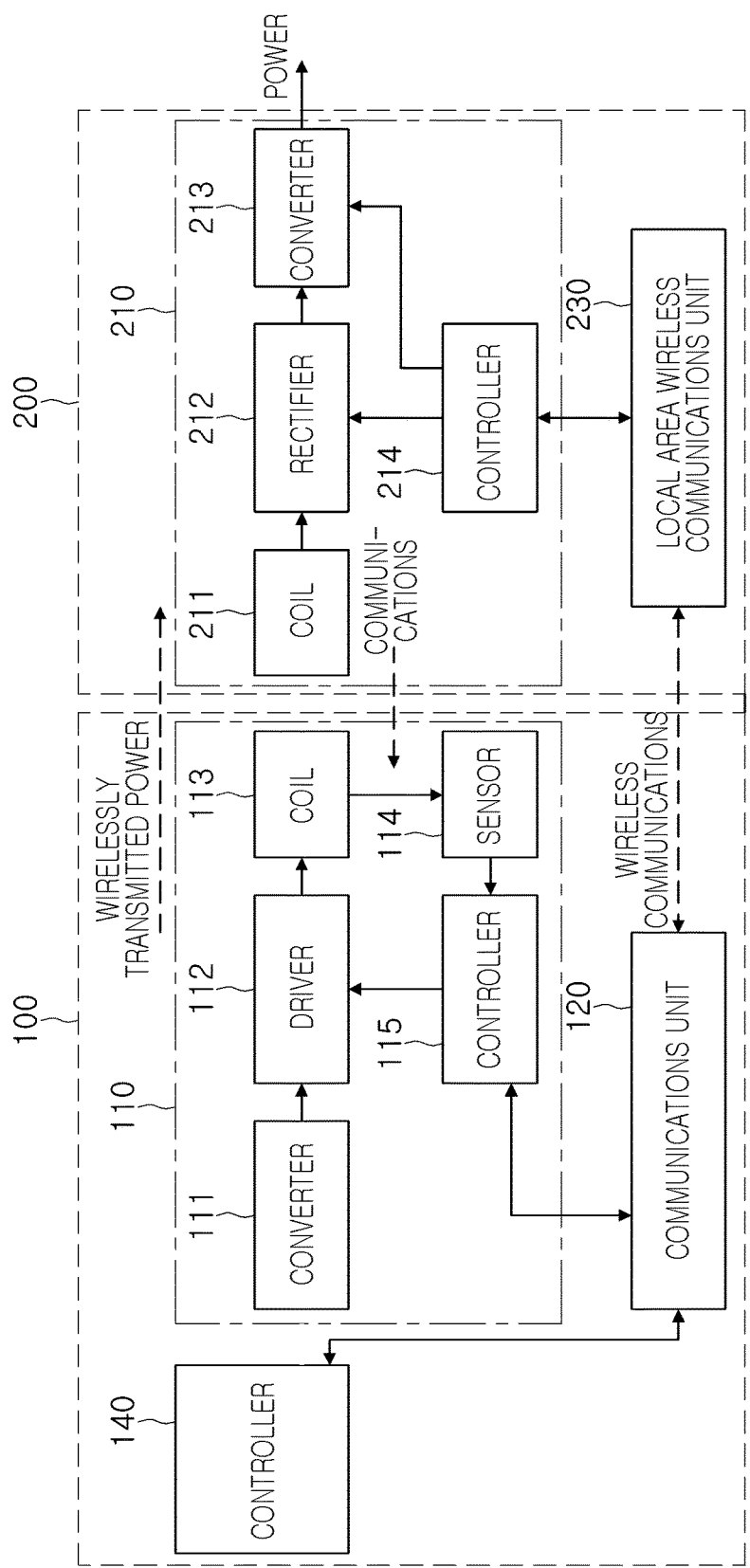
FIG. 3 is a block diagram illustrating an example of a circuit of a non-contact power transmission device and a non-contact power reception device.

FIG. 3 is a block diagram illustrating an example of a circuit of a non-contact power transmission device and a non-contact power reception device.

Referring to FIG. 3, a non-contact power transmission device 100 includes a power transmission unit 110, a communications unit 120, and a controller 140.

The power transmission unit 110 includes a converter 111, a driver 112, a coil 113, and a controller 115. In some examples, the power transmission unit 110 of the non-contact power transmission device 100 may include a sensor 114.

The converter 111 converts power supplied by an external source. A voltage of the converted power is amplified by the driver 112 and applied to the coil 113. The coil 113 is connected to a coil 211 of the non-contact power reception device 200 to contactlessly transmit power.

The sensor 114 senses a state of the coil 113. The controller 115 adjusts the wireless transmission of power by adjusting the driver 112 based on the state sensed by the sensor 114.

The communications unit 120 is connected to a local area wireless communications unit 230 of the non-contact power reception device 200 to wirelessly transmit and receive predetermined data.

The controller 140 performs various operations related to the location-based service, and the various operations will be described in detail with reference to the following drawings.

The non-contact power reception device 200 includes a power reception unit 210 and the local area wireless communications unit 230.

The power reception unit 210 includes the coil 211, a rectifier 212, a converter 213, and a controller 214.

The coil 211 contactlessly receives power transmitted by the coil 113 of the non-contact power transmission device 100. The received power is rectified by the rectifier 212 and converted by the converter 213 and the converted power is provided to the mobile terminal 300. The controller 214 controls operations of the rectifier 212 and the converter 213.

FIGS. 4A through 4D are configuration diagrams illustrating various examples of a non-contact power transmission device.

Figure 4A:
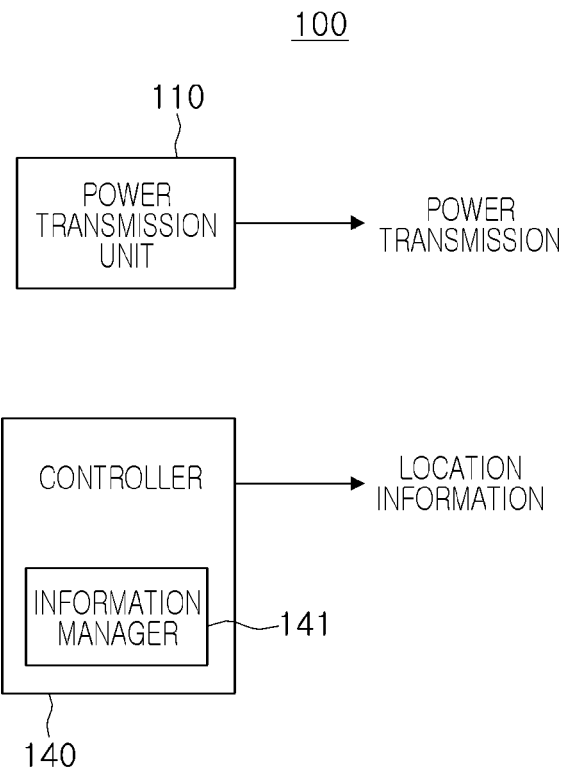
FIGS. 4A through 4D are configuration diagrams illustrating examples of a non-contact power transmission device.

Referring to FIG. 4A, a non-contact power transmission device 100 includes a power transmission unit 110 and a controller 140. The controller 140 includes an information manager 141.

The power transmission unit 110 contactlessly transmits power to a non-contact power reception device 200.

The information manager 141 provides location information assigned to the non-contact power transmission device 100 to other devices. In various examples, the information manager 141 provides the location information to the server 400 directly or indirectly.

Figure 4B:
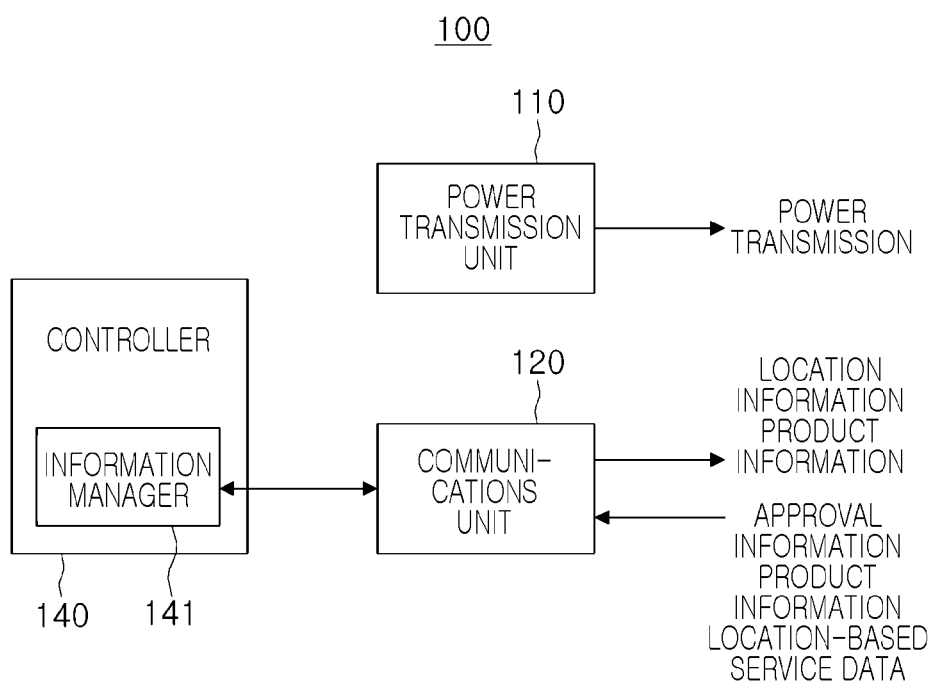

Referring to FIG. 4B, the non-contact power transmission device 100 further includes a communications unit 120.

The communications unit 120 performs local area wireless communications using a communication scheme such as near field communication (NFC), Bluetooth, Wi-Fi, Zigbee, or any other communication scheme known to one of ordinary skill in the art.

The communications unit 120 provides the location information of the non-contact power transmission device 100 provided by the information manager 141 to the server 400.

In one example, the communications unit 120 receives the product information from the non-contact power reception device 200. In detail, the communications unit 120 receives product information from the non-contact power reception device 200 and provides the product information to the information manager 141. In addition, the communications unit 120 receives an approval regarding power transmission and location-based service data from the server 400, and transmits the product information to the server 400.

Figure 4C:
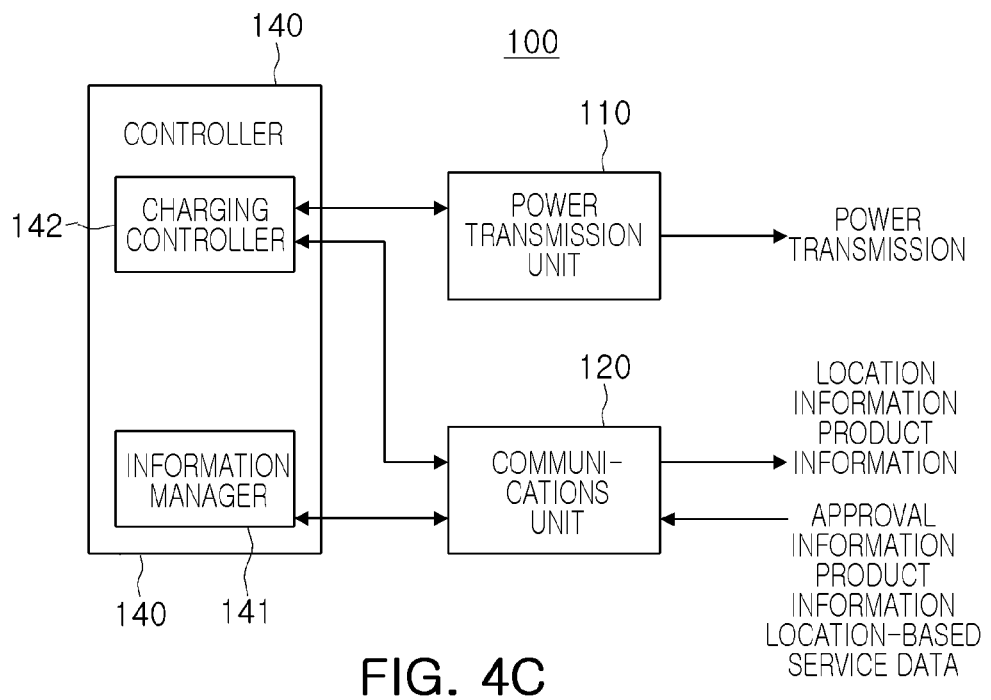

Referring to FIG. 4C, the controller 140 of the non-contact power transmission device 100 includes the information manager 141 and a charging controller 142.

The charging controller 142 approves a wireless charging of the non-contact power reception device 200.

In one example, the charging controller 142 authorizes the wireless charging of the non-contact power reception device 200 when the information manager 141 receives an approval for the wireless charging of the non-contact power reception device 200 from the server 400 through the communications unit 120. Thereafter, when the wireless charging of the non-contact power transmission device 100 is authorized by the charging controller 142, the information manager 141 receives the location-based service data from the server 400 through the communications unit 120. In another example, the information manager 141 may transmit the location information to the sever 400 only after the wireless charging of the non-contact power transmission device 100 is authorized by the charging controller 142.

Figure 4D:
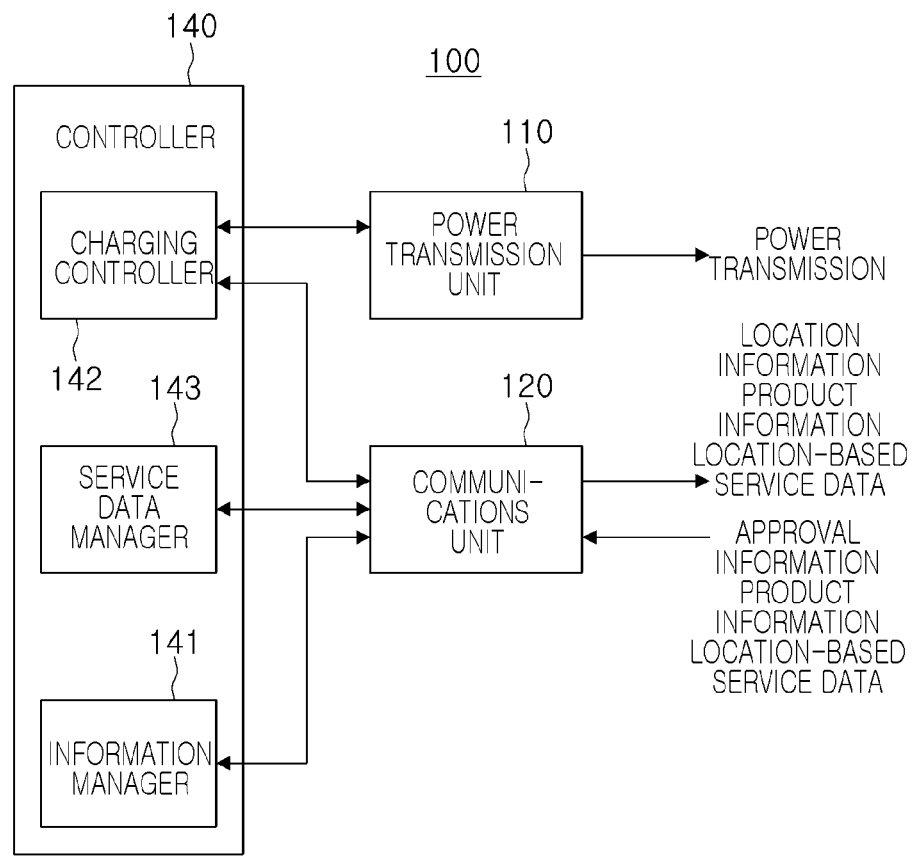

Referring to FIG. 4D, the controller 140 of the non-contact power transmission device 100 includes the information manager 141, the charging controller 142, and a service data manager 143.

The charging controller 142 is connected to the server 400 through the communications unit 120 to perform the authorization. For example, the charging controller 142 may determine the authority of the wireless charging of the non-contact power reception device 200, a charging time thereof, or other charging information related to the non-contact reception device 200.

The service data manager 143 receives location-based service data associated with a location of the non-contact power transmission device 100 from the server 400 through the communications unit 120. The service data manager 143 may provide the received location-based service data to the mobile terminal 300 through the communications unit 120.

The communications unit 120 is connected to the server 400. The communications unit 120 may be connected to the server 400 through a wired network or a wireless network. The communications unit 120 receives an authority to transmit power to the mobile terminal 300 or the non-contact power reception device 200, and the location-based service data for the location-based service, from the server 400.

Figure 5:
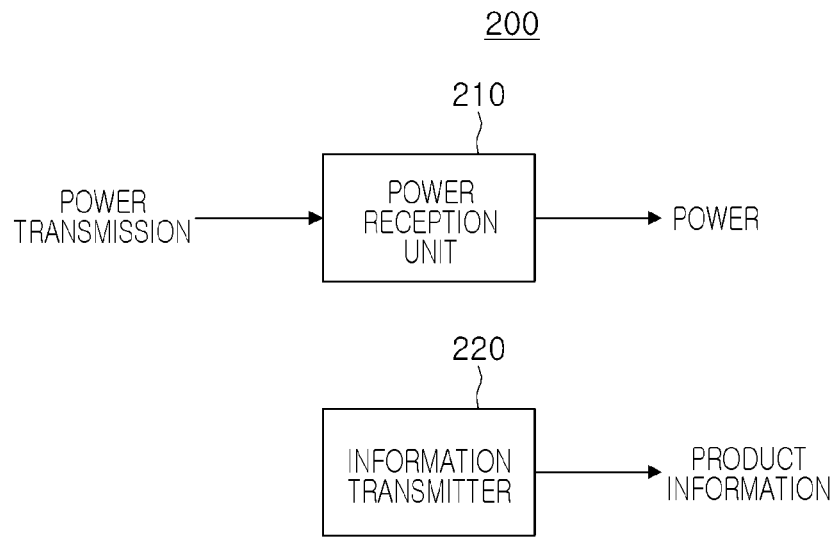
FIG. 5 is a configuration diagram illustrating an example of a non-contact power reception device.

FIG. 5 is a configuration diagram illustrating an example of a non-contact power reception device.

Referring to FIG. 5, a non-contact power reception device 200 includes a power reception unit 210 and an information transmitter 220.

The power reception unit 210 receives power from the non-contact power transmission device 100. The power reception unit 210 is electrically connected to the mobile terminal 300 and charges the mobile terminal 300 using the received power.

The information transmitter 220 transmits product information to the non-contact power transmission device 100 and the mobile terminal 300. In one example, the information transmitter 220 transmits the product information through the local area wireless communications unit 230 of FIG. 3.

The components described above may be incorporated into one circuit or implemented as separate circuits. For example, the information manager 141, the charging controller 142, and the service data manager 143 of the non-contact power transmission device 100 may be implemented in one integrated circuit corresponding to the controller 140. Alternatively, each of the information manager 141, the charging controller 142, and the service data manager 143 of the non-contact power transmission device 100 may be implemented as a separate integrated circuit, or some functions thereof may be implemented as part of the controller 115.

Figure 6:
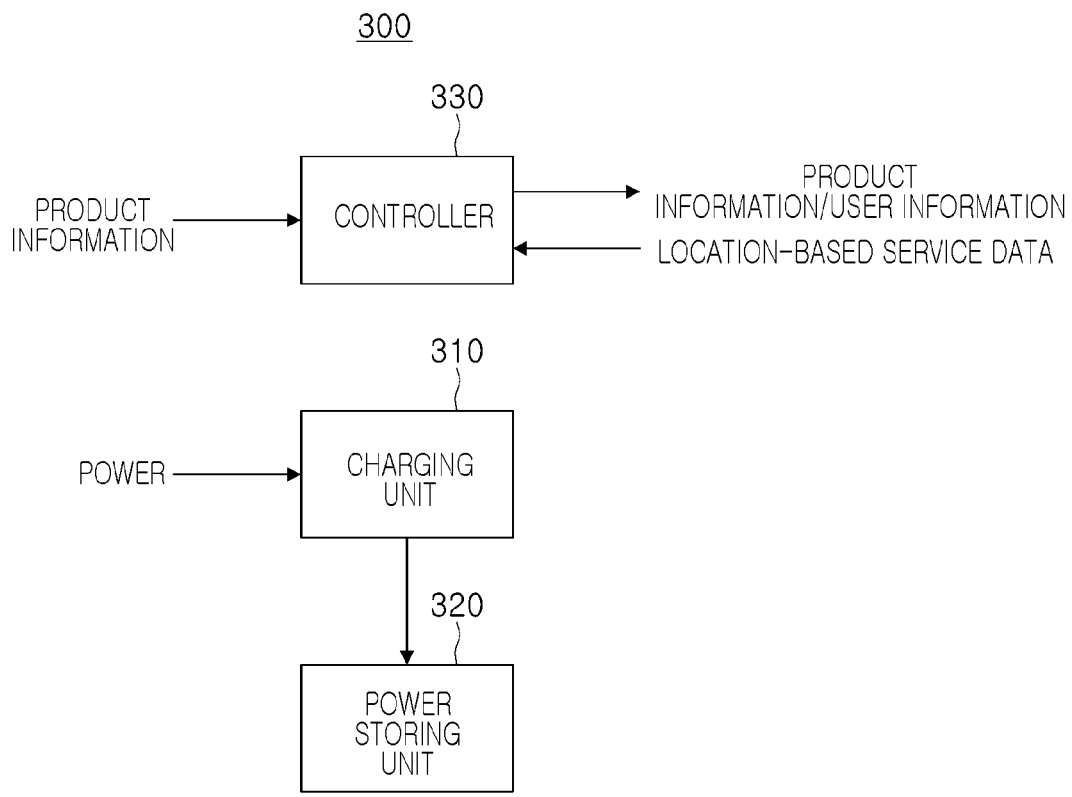
FIG. 6 is a configuration diagram illustrating an example of a mobile terminal.

FIG. 6 is a configuration diagram illustrating an example of a mobile terminal.

Referring to FIG. 6, a mobile terminal 300 includes a charging unit 310, a power storing unit 320, and a controller 330.

The charging unit 310 is connected to the non-contact power reception device 200 for charging. The charging unit 310 stores power provided by the non-contact power reception device 200 in the power storing unit 320.

The controller 330 receives product information from the non-contact power reception device 200 and provides the server 400 with the user information and product information assigned to the mobile terminal 300.

The controller 330 receives location-based service data associated with the location of the mobile terminal 300 from the server 400, or alternatively from the non-contact power transmission device 100.

Although not illustrated in FIG. 6, the mobile terminal 300 communicates with the non-contact power transmission device 100 or the server 400 directly or indirectly using the local area wireless communications module or another wireless communications module.

Figure 7:
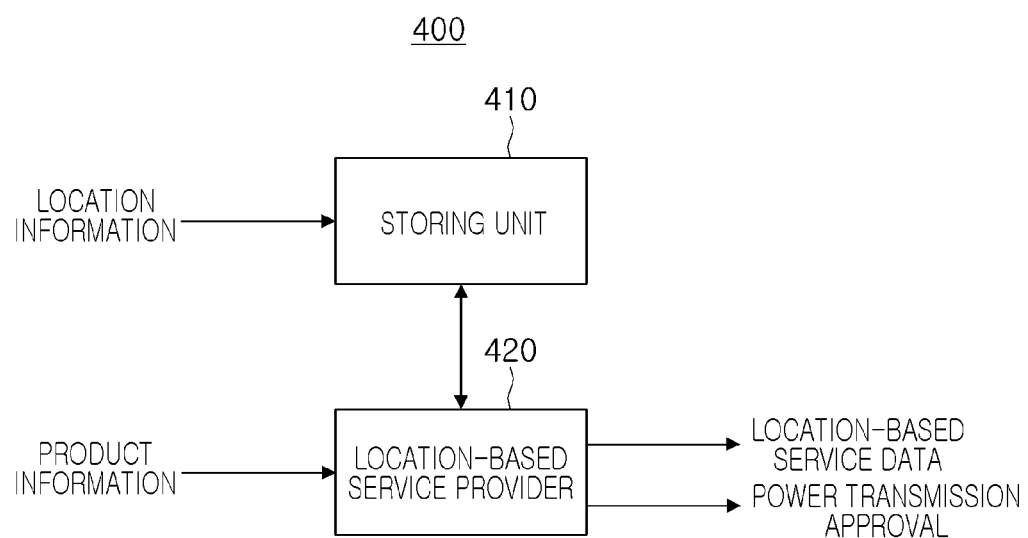
FIG. 7 is a configuration diagram illustrating an example of a server.

FIG. 7 is a configuration diagram illustrating an example of a server.

Referring to FIG. 7, a server 400 includes a storing unit 410 and a location-based service provider 420. Although not illustrated in FIG. 7, the server 400 also includes a communications unit that is connected to the mobile terminal 300 and the non-contact power transmission device 100.

The storing unit 410 stores location information assigned to the non-contact power transmission device 100, and location data associated with the location information of the non-contact power transmission device 100. The storing unit 410 receives the location information from the non-contact power transmission device 100, and outputs the location data associated with the received location information.

Using the location data, the location-based service provider 420 determines the location of the mobile terminal 300 to receive power from the non-contact power transmission device 100.

In one example, the location-based service provider 420 determines the location of the non-contact power transmission device 100 as the location of the mobile terminal 300 by identifying the location information assigned to the non-contact power transmission device 100 and the user information assigned to the mobile terminal 300.

In one example, the location-based service provider 420 provides location-based service data associated with the determined location of the mobile terminal 300 to the mobile terminal 300 or the non-contact power transmission device 100.

In addition, the location-based service provider 420 approves a power transmission of the non-contact power transmission device 100.

Hereinbefore, various examples of the location-based service system and various examples of the respective component devices configuring the location-based service system have been described.

Hereinafter, a location-based service method performed between the respective devices of the location-based service system will be described in further detail.

Figure 8:
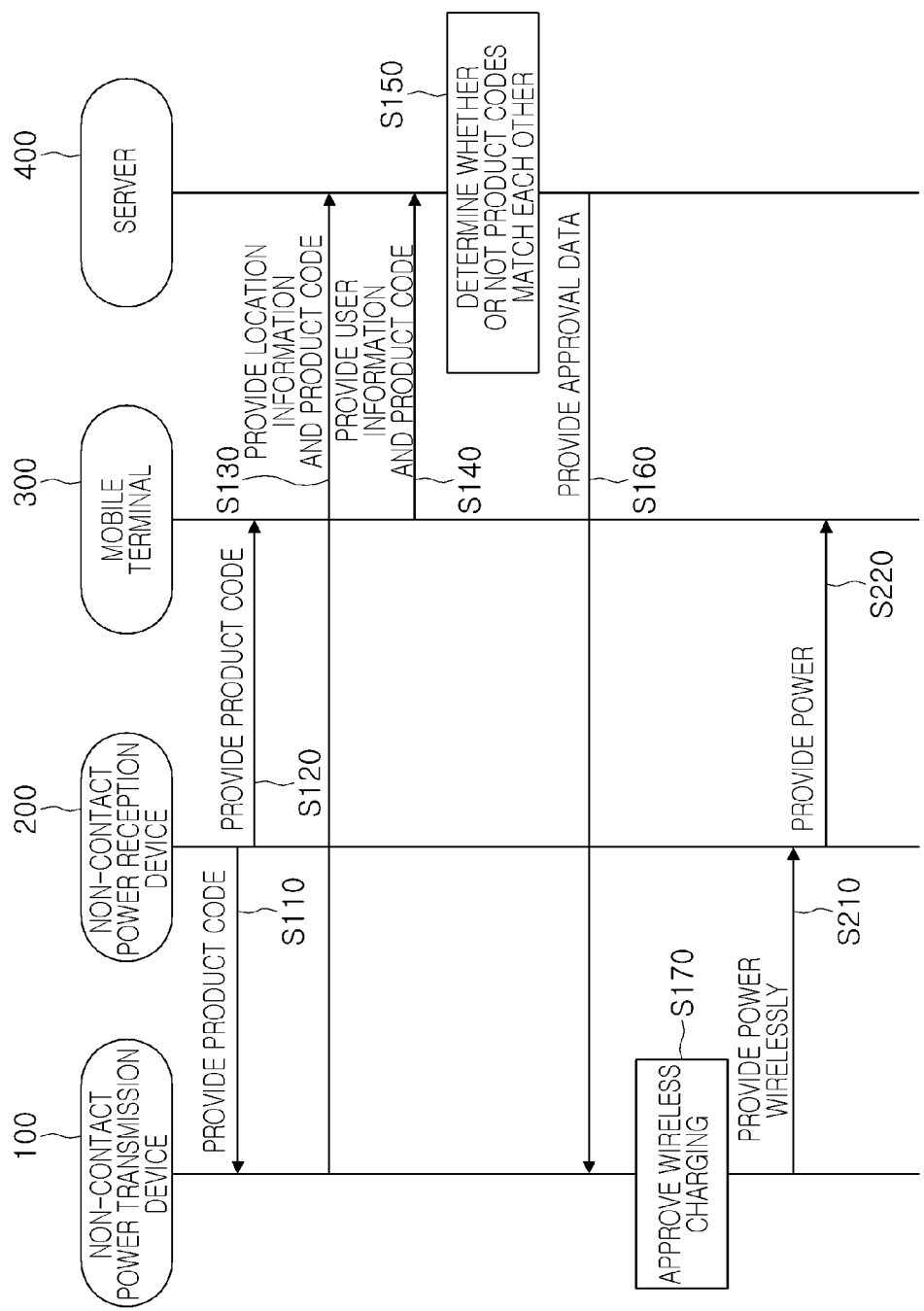
FIG. 8 is a flowchart illustrating an example of a method by which a non-contact power transmission device receives an approval to transmit electric power.

FIG. 8 is a flowchart illustrating an example of a method by which a non-contact power transmission device receives an approval to transmit electric power.

Referring to FIG. 8, a non-contact power transmission device 100 communicates with the server 400 to receive an approval to transmit electric power to the mobile terminal 300.

Specifically, the non-contact power transmission device 100 requests the approval data from the server 400 (S110). The non-contact power transmission device 100 approves the mobile terminal 300 or the non-contact power reception device 200 for charging using the approval data provided by the server 400.

As described above, the approval data may include additional information, such as whether the approval is paid or unpaid, a time during which the approval is valid, and other information, as well as whether or not the approval is possible. The server 400 may provide additional information to the non-contact power transmission device 100 to allow the non-contact power transmission device 100 to wirelessly provide electric power in a wider range of aspects.

Meanwhile, referring to FIG. 8, the non-contact power reception device 200 transmits a product code thereof to the non-contact power transmission device 100 and the mobile terminal 300 (S110, S120), the non-contact power transmission device 100 transmits the location information and the product code to the server 400 (S130), and the mobile terminal 300 transmits the user information and the product code to the server 400 (S140). The server 400 determines whether or not the product codes from the mobile terminal 300 and the non-contact power transmission device 100 match each other (S150), and transmits approval data approving a power transmission to the non-contact power transmission device 100 (S160) if the product codes match each other.

Subsequently, the non-contact power transmission device 100 approves wireless charging of the mobile terminal 300 (S170), and charges the mobile terminal 300 with electric power through the non-contact power reception device 200 (S210, S220).

Figure 9:
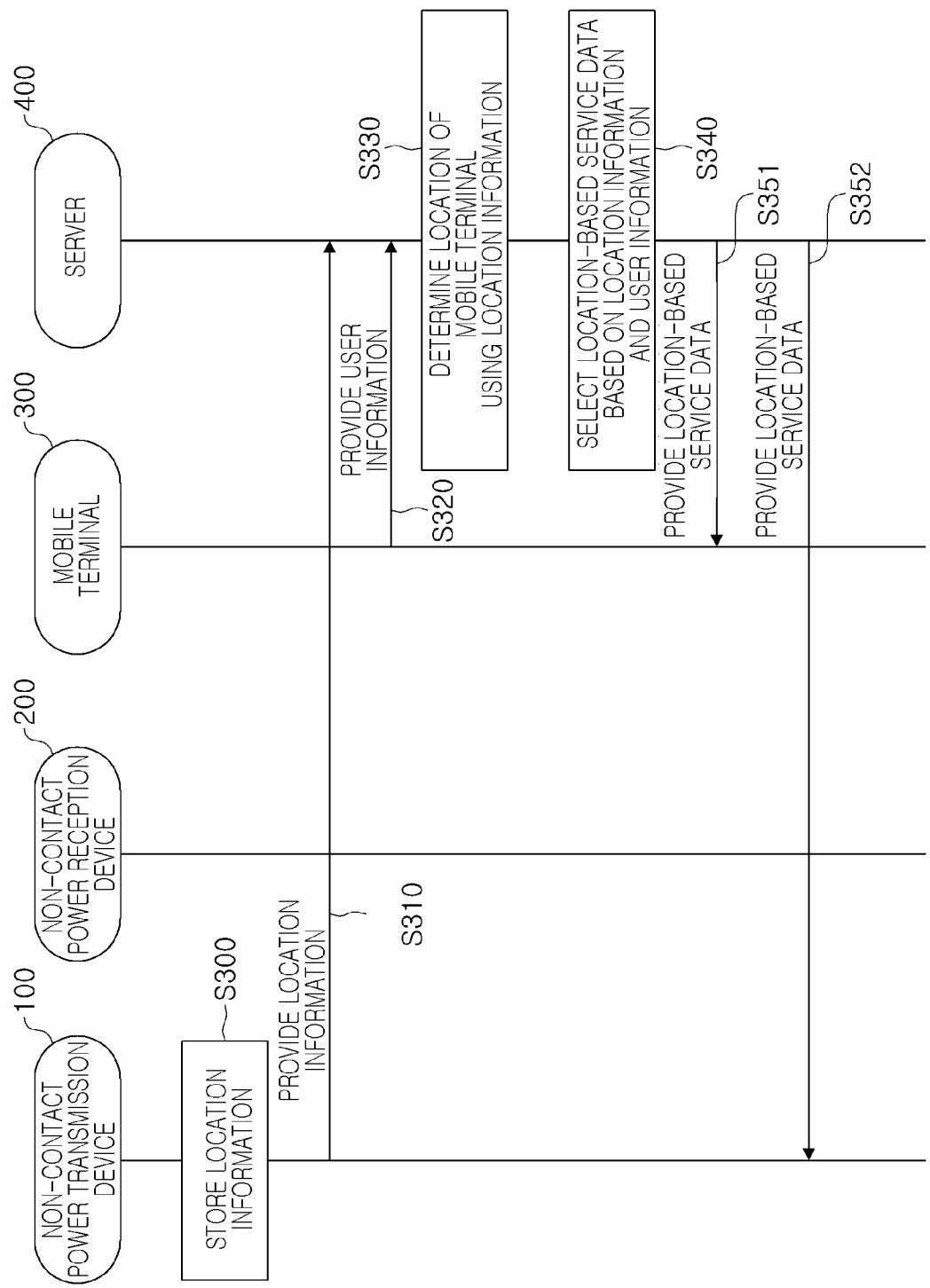
FIG. 9 is a flowchart illustrating an example of a method of providing location-based service data.

FIG. 9 is a flowchart illustrating an example of a method of providing location-based service data.

Referring to FIG. 9, when the wireless charging authority is provided, the non-contact power transmission device 100 provides location information assigned to itself to the server 400 (S310).

The server 400 determines the location of the mobile terminal 300 using the location information of the non-contact power transmission device 100 (S330). In detail, the server 400 identifies the location at which the non-contact power transmission device 100 is installed using the location information of the non-contact power transmission device 100, and determines the identified location as the location of the mobile terminal 300.

The server 400 selects the location-based service data associated with the identified location (S340), and provides the selected location-based service data to either one or both of the mobile terminal 300 (S351) and the non-contact power transmission device 100 (S352).

In various examples, the server 400 selects location-based service data using user information of the mobile terminal 300. In detail, the server 400 determines a kind, a quality, or other characteristics of the location-based service data, or whether the location-based service data is paid or unpaid, depending on a grade or an authority given to a user thereof. For example, the location-based service data may include a coupon, a free charging authority, and other service data. Alternatively, the location-based service data may be provided only when a specific condition (e.g., viewing a provided advertisement or other condition) has been satisfied.

Referring to FIG. 9, the non-contact power transmission device 100 stores the location information identifying its location (S300), and directly transmits the location information to the server 400 (S310), and the mobile terminal 300 transmits the user information to the server 400 (S320). The server 400 identifies the location of the mobile terminal 300 using the location information (S330), selects the location-based service data based on the location information and the user information (S340), and transmits the location-based service data of the server 400 to either one or both of the mobile terminal 300 (S351) and the non-contact power transmission device 100 (S352). Alternatively, the server 400 may select the location-based service data based only on the location information.

Figure 10:
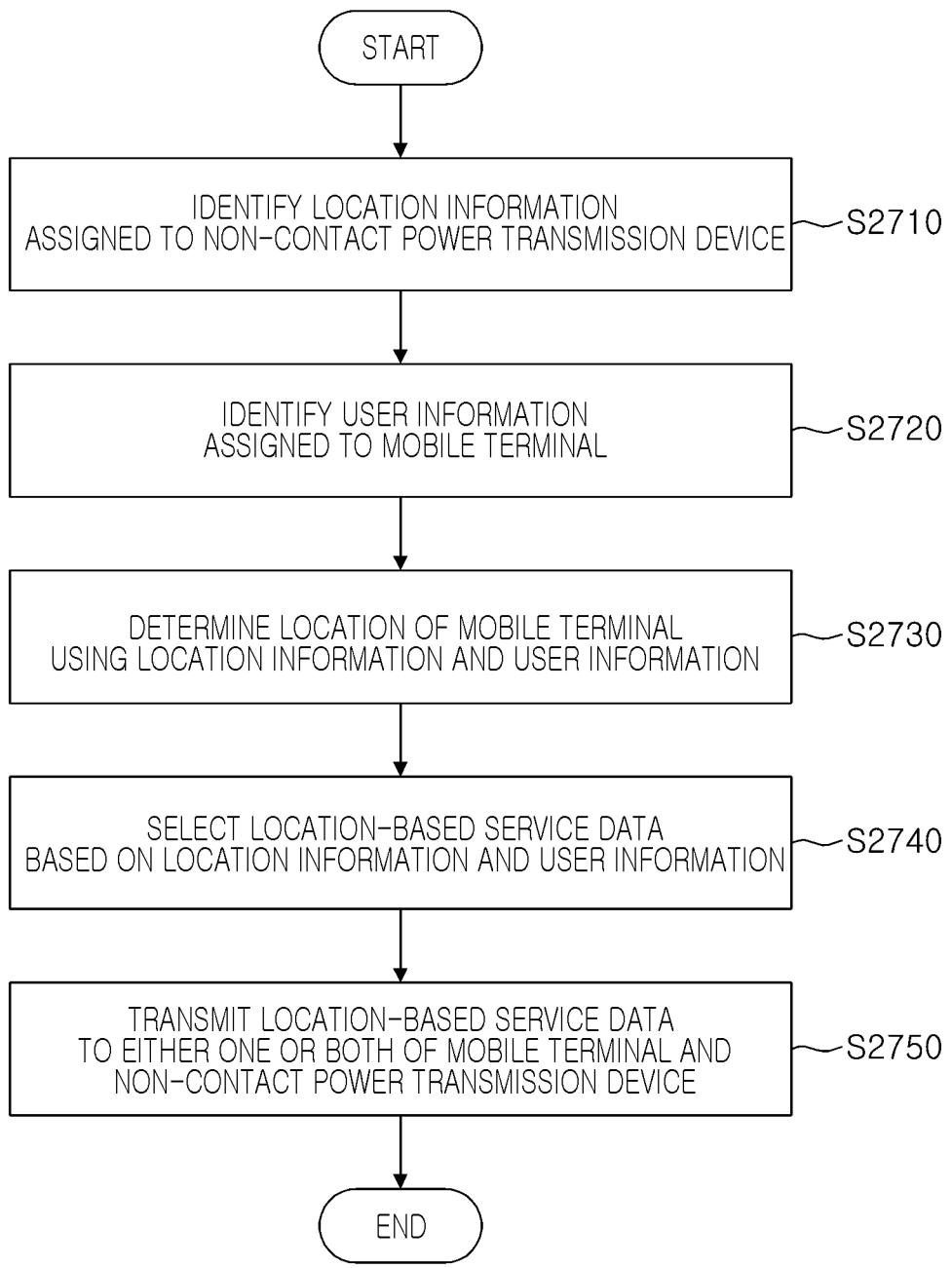
FIG. 10 is a flowchart illustrating an example of a method of providing location-based service data performed on a server.

FIG. 10 is a flowchart illustrating an example a method of providing location-based service data performed on the server.

The server 400 identifies location information assigned to the non-contact power transmission device 100 (S2710).

The server 400 identifies user information assigned to the mobile terminal 300 (S2720).

The server 400 determines the location of the mobile terminal 300 using the location information and the user information (S2730).

The server 400 selects the location-based service data based on the location information and the user information (S2740), and provides the selected location-based service data to either one or both of the mobile terminal 300 and the non-contact power transmission device 100 (S2750). Alternatively, the server 400 may select the location-based service data based only on the location information.

In the various examples described above, the location-based service is provided to users using the information associated with the location at which power is wirelessly charged. A location is accurately identified independent of an environmental influence around the user by providing the location-based service to the user based on the location of the wireless power charging device. In addition, since the wireless power charging service and the location-based service are provided simultaneously, service accessibility for the user is improved. Power is contactlessly transmitted to an approved mobile terminal or non-contact power reception device to charge the approved mobile terminal or non-contact power reception device contactlessly.

In the examples described above, the location-based service is provided using the information regarding the location at which wireless charging is performed.

In the examples described above, a location is accurately identified independent of an environmental influence around the user by providing the location-based service to the user based on the location of the wireless power charging device.

In the examples described above, since the wireless power charging and the location-based service are provided simultaneously, service accessibility for the user is improved.

In the examples described above, the approved mobile terminal is contactlessly charged with electric power.

The controllers 115, 140, 214, and 330, the communications units 120, the local area wireless communications unit 230, the information manager 141, the charging controller 142, the service data manager 143, the information transmitter 220, the location-based service and provider 420 in FIGS. 3, 4A-4D, and 5-7 that perform the operations described herein with respect to FIGS. 1-10 are implemented by hardware components. Examples of hardware components include controllers, generators, drivers, memories, comparators, arithmetic logic units, adders, subtractors, multipliers, dividers, integrators, analog-to-digital (A/D) converters, digital-to-analog (D/A) converters, amplifiers, line drivers, radios, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-10 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A non-contact power transmission device comprising:
   a power transmission unit configured to contactlessly provide electric power;
   a controller configured to provide location information of the non-contact power transmission device; and
   a communications unit configured to transmit the location information and product information received from a non-contact power reception device to a server, and receive an approval to transmit electric power to the non-contact power reception device from the server.

2. The non-contact power transmission device of claim 1, wherein the controller comprises an information manager configured to provide the location information.

3. The non-contact power transmission device of claim 2, wherein the controller further comprises a charging controller configured to determine an authority for charging based on the approval to transmit electric power received from the server.

4. The non-contact power transmission device of claim 3, wherein the information manager is further configured to control the communications unit to transmit the location information to the server in response to the authority for charging being determined by the charging controller.

5. The non-contact power transmission device of claim 4, wherein the communications unit is further configured to receive location-based service data associated with the location information from the server; and
   the controller further comprises a service data manager configured to receive the location-based service data associated with the location information from communications unit.

6. A location-based service system comprising:
   a non-contact power transmission device configured to contactlessly provide electric power, receive product information of a non-contact power reception device, and transmit the product information and location information of the non-contact power transmission device;
   a non-contact power reception device configured to receive the electric power from the non-contact power transmission device and transmit the product information;
   a mobile terminal configured to be charged by electric power by the non-contact power reception device, receive the product information, and transmit the product information and user information of the mobile terminal; and
   a server configured to receive the location information, the product information from the non-contact power transmission device and the mobile terminal, and the user information, approve the non-contact power transmission device to transmit electric power in response to the product information received from the non-contact power transmission device matching the product information received from the mobile terminal, and transmit location-based service data based on the location information of the non-contact power transmission device.

7. The non-contact power transmission device of claim 6, wherein the server is further configured to transmit the location-based service data to either one or both of the non-contact power transmission device and the mobile terminal.

8. The non-contact power transmission device of claim 6, wherein the mobile terminal comprises:
   a charging unit configured to be charged by electric power contactlessly received from the non-contact power reception device according to an approval for the non-contact power transmission device to transmit electric power provided by the server; and
   a controller configured to transmit the user information and the product information to the server.

9. The non-contact power transmission device of claim 8, wherein the controller of the mobile terminal is further configured to receive the location-based service data.

10. The non-contact power transmission device of claim 6, wherein the server comprises:
    a storing unit configured to store location information assigned to the non-contact power transmission device and location data associated with the location information, receive the location information from the non-contact power transmission device, and output the location data; and
    a location-based service provider configured to receive the location data, the product information from the non-contact power transmission device and the mobile terminal, and the user information, determine a location of the mobile terminal using the location data, approve the non-contact power transmission device to transmit electric power in response to the product information received from the non-contact power transmission device matching the product information received from the mobile terminal, and transmit the location-based service data based on the determined location of the mobile terminal.

11. The non-contact power transmission device of claim 10, wherein the location-based service provider of the server is further configured to determine the location of the non-contact power transmission device as the location of the mobile terminal based on the location data and the user information.

12. The non-contact power transmission device of claim 6, wherein the server is further configured to transmit the location-based service data based on the location information of the non-contact power transmission device and the user information of the mobile terminal.

13. A wireless power transmission device comprising:
    a power transmission unit configured to wirelessly transmit power to a wireless power reception device; and
    a controller configured to:
       provide location information enabling a server to identify a location of a mobile terminal, the mobile terminal either being connected to or comprising the wireless power reception device; and
       control the power transmission unit to wirelessly transmit power to the wireless power reception device in response to an approval by the server of wireless transmission of power to the wireless power reception device.

14. The wireless power transmission device of claim 13, further comprising a communications unit configured to transmit the location information to the server, and receive approval information indicating the approval from the server;

wherein the controller is further configured to control the power transmission unit to wirelessly transmit power to the wireless power reception device based on the approval information.

15. The wireless power transmission device of claim 14, wherein the communications unit is further configured to receive from the wireless power reception device product information enabling the server to approve the wireless transmission of power to the wireless power reception device, and transmit the product information to the server.

16. The wireless power transmission device of claim 13, wherein the controller is further configured to receive location-based service data selected by the server based on the location information.

17. The wireless power transmission device of claim 16, further comprising a communications unit configured to transmit the location information to the server, receive approval information indicating the approval from the server, and receive the location-based service data from the server;
  wherein the controller is further configured to control the power transmission unit to wirelessly transmit power to the wireless power reception device based on the approval information.

18. The wireless power transmission device of claim 17, wherein:
  the mobile terminal is connected to the wireless power reception device,
  the communications unit is further configured to transmit the location-based service data to the mobile terminal, and
  the mobile terminal is configured to be charged by power wirelessly received by the wireless power reception device from the power transmission unit.

* * * * *